BOBBIE J. PATTON
JOHN L. FITCH
INVENTORS

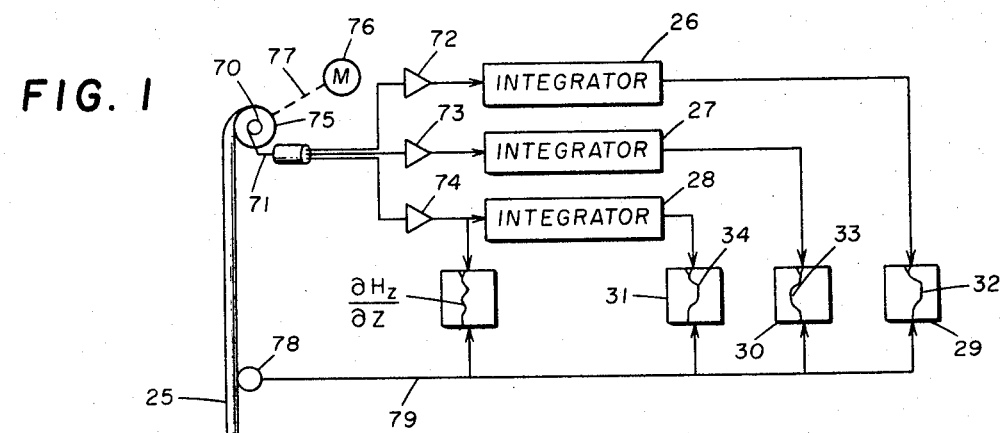

BY *Archur F Zobal*

ATTORNEY

United States Patent Office 3,391,335
Patented July 2, 1968

1

3,391,335
USE OF MAGNETIC FIELD GRADIENT MEASURING LOGS TO DETERMINE THE MAGNETIZATION OF THE EARTH'S FORMATIONS ALONG A BOREHOLE
Bobbie J. Patton and John L. Fitch, Dallas, Tex., assignors to Mobil Oil Corporation, a corporation of New York
Filed June 28, 1965, Ser. No. 467,420
9 Claims. (Cl. 324—8)

ABSTRACT OF THE DISCLOSURE

The specification discloses a method of determining the magnetization of subsurface formations at points of interest spaced along a borehole traversing the formations by determining the total formation magnetic field at an initial starting point in the borehole, measuring the magnetic field gradient in the borehole from the starting point to a point of interest spaced vertically therefrom, integrating the gradient from the starting point to the point of interest, combining the formation magnetic field determined at the starting point with the gradient integral obtained at the point of interest to determine the formation magnetic field at the point of interest, and determining the magnetization of the surrounding formations producing the magnetic field determined at the point of interest.

---

This invention relates to the measurement of formation magnetism employing well logging techniques and more particularly to a method of obtaining formation magnetism measurements from formation field measurements obtained in a borehole and from formation magnetism measurements carried out at a single location along the borehole.

In the investigation of subsurface formations, remanent magnetism of the rock formations is of interest, for example, for correlation purposes or for use as a time marker in determining formation age. In present-day applications, remanent magnetism is measured from cores obtained during drilling. This technique, however, requires a core for each section of interest and hence is time consuming and costly.

In accordance with the present invention, there is provided a novel technique for obtaining measurements of the remanent magnetism of formations traversed by a borehole and which eliminates the need for obtaining a core for each formation of interest. In the present technique, the formation magnetic field in a borehole is determined at a predetermined starting point. The formation magnetic field gradient along the borehole then is measured from the starting point and integrated. The field gradient measured is that in the vertical direction. The formation magnetic field determined at the starting point is combined with the gradient integral obtained at desired locations spaced from the starting point to determine the total formation magnetic field at the desired points of interest. From the formation magnetic field obtained at the desired points of interest, the formation magnetism producing the magnetic field is determined, for example, by calculation or by an iterative procedure. Correction is made to eliminate the effect of induced magnetism to measure remanent magnetism of the formations.

In the preferred embodiment, the formation magnetic field at the starting point is determined at least in part from a core obtained in the particular formation surrounding that point. This field is treated as a constant of integration. The addition of this constant to the integral of the formation magnetic field gradient thus will give the total formation field at any other point in the borehole. Determination of the formation magnetism from the formation field obtained by addition of the constant of integration and the magnetic field gradient integral thus allows us to determine the formation magnetism at many points along the borehole from only one core measurement.

For further objects and advantages of the present invention and for a more complete understanding thereof, reference may be had now to the following detailed description taken in conjunction with the accompanying drawings wherein:

FIGURE 1 illustrates a borehole logging system useful in carrying out the present invention;

FIGURES 2A and 2B illustrate traces useful in understanding the present invention;

Figure 4:
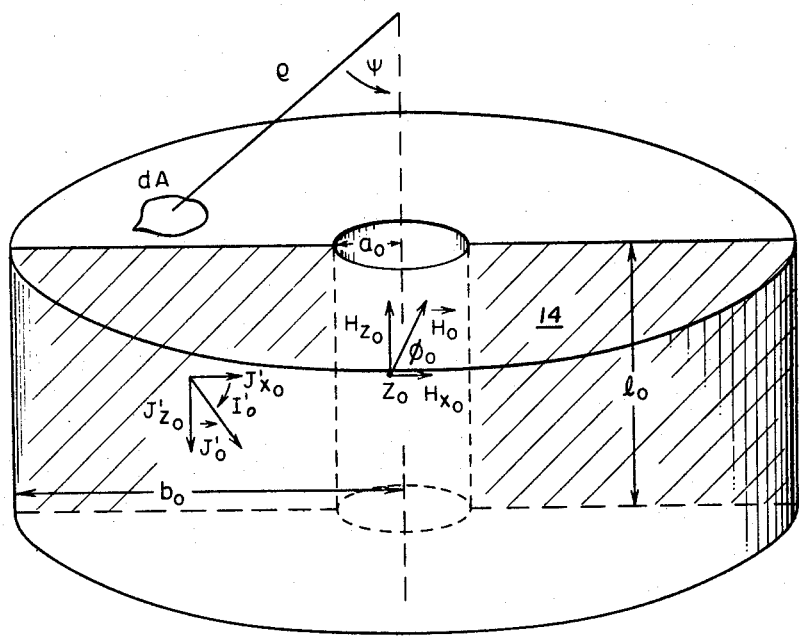
FIGURE 4 is a section of the reference formation.

Referring now to FIGURE 1, there are illustrated formations 10, 11, and 12, traversed by a borehole 13 and of which it is desired to obtain information about the magnitude and direction of remanent magnetism. In obtaining such measurements, the formation field $\vec{H}_o$ at a starting point $z_o$, in the borehole surrounded by a reference formation 14, is determined. The magnetic field gradient in the borehole from the position $z_o$ then is measured and added to the field $H_o$ to obtain the total formation field $\vec{H}_n$ at any point of interest along the borehole. From these field measurements, there is determined the magnetization $\vec{J}_n$ of the formations producing the field.

In the preferred embodiment, the formation field $\vec{H}_o$ at $z_o$ is determined from a core obtained during drilling. Measurement of the core by well-known techniques yields the magnitude and the direction of the remanent magnetization at this point. The induced magnetization due to the known earth's field is determined from susceptibility measurements and added vectorially to the remanent magnetization to determine the total formation magnetization. The total magnetization of formation 14 then is employed to determine by calculation the field $\vec{H}_o$ in the borehole and due to the reference formation bed 14 surrounding the borehole at $z_o$.

The field gradients measured in the borehole from $z_o$ are obtained by instrumentation contained in a borehole tool, illustrated at 15. The gradient measurements obtained are those in the vertical direction z and are represented by $\partial\vec{H}/\partial Z$. Since the earth's field is relatively constant over borehole depth, the field gradients measured will be due primarily to variations in the magnetic field from the formations. Integration of the field gradients then is carried out from $z_o$ to points of interest which may be formations 10, 11, 12, or to the surface. Addition of the field, $\vec{H}_o$, which is a constant of integration, and the integrated gradient field, then give the total formation field $\vec{H}_n$ at any point of interest in the borehole. This relationship may be expressed as $$\vec{H}_n = \int_{z_o}^{z_n} \frac{\partial \vec{H}}{\partial Z} + \vec{H}_o \qquad (1)$$

wherein: $z_n$ is the point of interest spaced from $z_o$ where measurements are desired.

Knowing $\vec{H}_n$, the formation magnetization $\vec{J}_n$ producing $H_n$, then may be determined by calculation or by any iterative procedure. The calculations employed are the reverse of those employed in determining the field, $\vec{H_o}$, produced by the magnetization of the reference formation 14.

In the above technique, the formation magnetism $\vec{J_n}$ measured is the total formation magnetization. If only the remanent magnetization is wanted and the induced magnetization is not negligible, a correction will be made. The value of the induced magnetization can be determined by measuring the susceptibility of the section of interest by magnetic susceptibility logging, for example, and by employing the susceptibility measured to calculate the induced magnetization using the known earth's magnetic field. The remanent magnetization is then determined by vector subtraction of the induced magnetization from the total magnetization.

Referring again to FIGURE 1, there will be described briefly the borehole system employed for measuring the magnetic field gradients. Such a system is described in our copending U.S. Patent No. 3,317,821 issued May 2, 1967, entitled Logging System Including Electrical Coil Supported without Rotation for Measuring Subsurface Formation Magnetic Field Gradients and assigned to the same assignee as the present application. As illustrated, the system comprises three coils 20, 21, and 22 mounted along perpendicular axes $x$, $y$, and $z$. These coils are supported in a housing 23 which is stabilized by a gyroscopic stabilizer system illustrated at 24. Movement of the tool 15 by cable 25 thus imparts translatory motion to the three coils whereby a voltage is induced in each coil which is proportoinal to the rate of change of magnetic flux through the coil. The rate of change of magnetic flux is proportional to a component of the magnetic field gradient. Since the earth's magnetic field is relatively constant, the voltage induced will be representative primarily of the gradient of the local magnetic field. In the system shown, the gradients of the $x$, $y$, and $z$ components of the field $\vec{H}$ with respect to the $z$ direction are obtained by the three coils 20, 21, and 22. These gradients are represented, respectively, by the following expressions:

$$\partial H_x/\partial Z, \; \partial H_y/\partial Z, \; \partial H_z/\partial Z \quad (2)$$

The outputs of the coils 20, 21, and 22 are applied, respectively, to the surface to integrators 26, 27, and 28, the outputs of which are applied, respectively, to recorders 29, 30, and 31. The charts of these recorders are driven in correlation with depth, whereby there are produced three traces 32, 33, and 34 representative of the integrated values of the gradients from the starting point $z_0$ to any point of interest $z_n$ along the borehole. The integrated values of the gradients of the $x$, $y$, and $z$ field components are represented by the following expressions:

$$\int_{z_0}^{z_n} \frac{\partial H_x}{\partial Z}, \; \int_{z_0}^{z_n} \frac{\partial H_y}{\partial Z}, \; \int_{z_0}^{z_n} \frac{\partial H_z}{\partial Z} \quad (3)$$

In order to obtain the total field $\vec{H_n}$ at any point of interest in the borehole, the gradient integrals are added vectorially to the $x$, $y$, and $z$ field components of $\vec{H_o}$ obtained at point $z_0$. Thus, $\vec{H_n}$ may be expressed in the following manner:

$$\vec{H_n} = \left[\int_{z_0}^{z_n} \frac{\partial H_x}{\partial Z} + H_{x_0}\right]i + \left[\int_{z_0}^{z_n} \frac{\partial H_y}{\partial Z} + H_{y_0}\right]j + \left[\int_{z_0}^{z_n} \frac{\partial H_z}{\partial Z} + H_{z_0}\right]k \quad (4)$$

wherein:
$H_{x_0}$, $H_{y_0}$, and $H_{z_0}$ are the $x$, $y$, and $z$ components of the total formation field at $z_0$; and
$i$, $j$, $k$ are unit vectors in the $x$, $y$, $z$ directions, respectively.

The trace of FIGURE 2A illustrates the $z$ component of the formation field $\vec{H_n}$ determined, in accordance with the present invention, in the borehole opposite formations 10, 11, and 12. As is evident, this trace is the combination of the $z$ component $H_{z_0}$ of the constant of integration $\vec{H_o}$ and the integral of the $z$ component of the field gradient.

The method of obtaining $\vec{H_o}$ now will be described. In one embodiment, a magnetic susceptibility log may show that the magnetic susceptibility of a reference formation is so low that the remanent magnetization can be assumed to be negligible. In case the zone of negligible magnetization is of substantial vertical extent, the constant of integration $\vec{H_o}$ may be assumed to be zero.

In the preferred embodiment, however, the constant of integration $\vec{H_o}$ is determined by measuring the remanent magnetization of a well core and employing the measured value plus the induced magnetization to determine the field in the borehole due to the magnetization of the surrounding formation. The core of interest is illustrated at 40 in FIGURE 3 and has been cored from the reference formation 14 during drilling. During coring, the core 40 is oriented with respect to magnetic north, shown in the $x$ direction in FIGURE 3. A suitable coring and orienting system, available from Eastman Oil Well Survey Company, Denver, Colo., is disclosed in Composite Catalog of Oil Field Equipment and Services, 1960–1961, volume 1. After coring, the core may be placed in a suitable spinner type magnetometer, of the type, for example, described in Journal of Geophysical Research, volume 69, Number 12, June 15, 1964, pp. 2455–2463, "A Spinner Magnetometer" by Gough, in order to determine the magnitude and direction of the remanent magnetization. More particularly, by spinning the core about the $z$ axis, the remanent magnetization component $J_{xy_0}$ in the $x$-$y$ plane may be determined as well as its angle, $D_o$, with respect to magnetic north. Knowing this information, the magnetization components $J_{y_0}$ and $J_{x_0}$ may be calculated. The core may then be spun, for example, about its $x$ axis to determine the magnetization component $J_{yz_0}$ as well as the direction thereof.

From this information, $J_{z_0}$ may be calculated. The total remanent magnetization $\vec{J_o}$ and the direction determined by the declination angle $D_o$ and the inclination angle $I_o$ may be obtained by calculation employing $J_{x_0}$, $J_{y_0}$ and $J_{z_0}$.

Further core measurements or susceptibility logging, for example as described in Geophysics, volume 17, Number 1, January 1952, "Magnetic Well Logging" by R. A. Broding et al., may be carried out to determine the susceptibility of formation 14. Multiplication of this value with the earth's field, which may be measured at the surface, gives the induced magnetization, the direction of which is the same as that of the earth's field. Vector addition of the remanent magnetization $\vec{J_o}$ and the induced magnetization is carried out to obtain the total core magnetization $\vec{J'_o}$ which includes the angle of declination $D'_o$ and the angle of inclination $I'_o$ (see FIGURE 4).

Knowing $\vec{J'_o}$ of the core, the field in the borehole $\vec{H_o}$ due to $\vec{J'_o}$ may be determined by a mathematical operation, for example, a surface integration technique which now briefly will be described. In this example, the field is determined for the special case of a hollow coin-shaped slab which is the reference formation 14 surrounding the borehole as illustrated in FIGURE 4.

It can be shown that the incremental field $\overrightarrow{dH}$ at a point due to a surface magnetic charge $\sigma$ is equal to the following expression:

$$\overrightarrow{dH} = \frac{\sigma d\overrightarrow{A} \cos \Psi}{4\pi\mu_0 \rho^2} \quad (5)$$

wherein:
- $dA$ is the area of the surface charge;
- $\mu_0$ is the permeability of free space; and
- $\rho$ is the distance from the charge $\sigma$ to the point where the field is to be calculated.

The physical relationship of this expression is illustrated in FIGURE 4. In this example, $\Psi$ is the angle between $\rho$ and the center of the borehole.

If the expression $$\sigma = -|\overrightarrow{J'_0}| \sin I'_0 \quad (6)$$

is substituted into Equation 5, and integration of $\overrightarrow{dH}$ is carried out over the top and bottom surfaces of the coin-shaped formation 14, one obtains the following expression for $\overrightarrow{H_{z_0}}$.

$$\overrightarrow{H_{z_0}} = \frac{2\pi|\overrightarrow{J'_0}| \sin I'_0}{\mu}[G_1 + G_2 - G_3 - G_4] \quad (7)$$

wherein:
$G_1$, $G_2$, $G_3$, and $G_4$ are geometric factors which may be expressed in the following manner:

$$G_1 = \frac{d_0 + l_0/2}{[a_0^2 + (d_0 + l_0/2)^2]^{1/2}} \quad (8)$$

$$G_2 = \frac{d_0 + l_0/2}{[b_0^2 + (d_0 - l_0/2)^2]^{1/2}} \quad (9)$$

$$G_3 = \frac{d_0 + l_0/2}{[a_0^2 + (d_0 - l_0/2)^2]^{1/2}} \quad (10)$$

$$G_4 = \frac{d_0 + l_0/2}{[b_0^2 + (d_0 + l_0/2)^2]^{1/2}} \quad (11)$$

wherein:
- $a_0$ is the radius of the borehole within formation 14;
- $l_0$ is the thickness of formation 14;
- $b_0$ is the radius of formation 14; and
- $d_0$ is the vertical distance from reference point $z_0$ to the center of the borehole volume formed within formation 14 and is zero in the event that $z_0$ coincides with the center.

If the following expression $$\sigma = |\overrightarrow{J'_0}| \cos I'_0 \quad (12)$$

is substituted into Equation 5 and integration is carried out over the cylindrical surface of the formation 14, one obtains the following expression for $H_{xy_0}$ which is the borehole field component in the $x$–$y$ plane.

$$H_{xy_0} = \frac{\pi|\overrightarrow{J'_0}| \cos I'_0}{\mu}[G_1 + G_2 - G_3 - G_4] \quad (13)$$

If the term $g_0$ is substituted for $$\frac{\pi}{\mu}[G_1 + G_2 - G_3 - G_4] \quad (14)$$

then Equations 7 and 13, respectively, become $$H_{z_0} = 2|J'_0| \sin I'_0 g_0 \quad (15)$$

$$H_{xy_0} = |J'_0| \cos I'_0 g_0 \quad (16)$$

Figure 3:
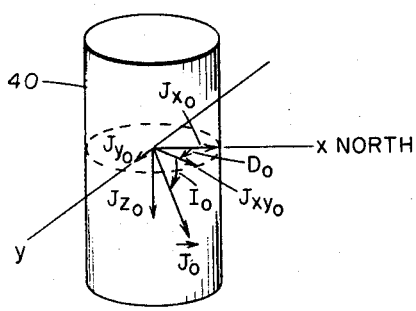
FIGURE 3 illustrates a core obtained from a reference formation.
Figure 5:
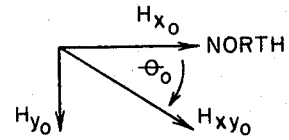
FIGURE 5 is a vector diagram useful in understanding the present invention.

From the core 40 of FIGURE 3 and the susceptibility measurements, one obtains the angle of declination $D'_0$ of $J'_{xy_0}$ with respect to magnetic north. The field components $H_{xy_0}$ (see FIGURE 5) will have the same direction with respect to magnetic north whereby $$D'_0 = \theta_0 \quad (17)$$

Thus, knowing this angle and the magnitude of $H_{xy_0}$, one is able to calculate $H_{x_0}$ and $H_{y_0}$. From $H_{x_0}$, $H_{y_0}$, and $H_{z_0}$, the magnitude and direction of $\overrightarrow{H_0}$ may then be obtained by calculation.

In FIGURE 4, the angle of $\overrightarrow{H_0}$ with respect to the $x$–$y$ plane is defined by $\phi_0$. The tangent of this angle may also be defined by the following expression:

$$\tan \phi_0 = \frac{H_{z_0}}{H_{xy_0}} = \frac{2|\overrightarrow{J'_0}| \sin I'_0 g_0}{|\overrightarrow{J'_0}| \cos I'_0 g_0} = \tan I'_0 \quad (18)$$

The magnitude and direction of $H_0$ now is well defined.

If one now considers a slab-shaped formation of very large radius, which is generally the case, whereby $b_0$ is very large, then the geometric factors $G_2$ and $G_4$ of Equations 7 and 13 approach zero. Thus, the geometric term $g_0$ of Equations 15 and 16 may be determined, from knowledge of $\mu_0$, measurement of $l_0$ and $a_0$, and appropriate selection of $z_0$ in the borehole within the reference formation to obtain $d_0$. The borehole radius $a_0$ may be determined by a caliper log, while the thickness of $l_0$ of the starting bed 14 may be determined, for example, by recording by recorder 50 of FIGURE 1, the change of $H_z$ with respect to the $z$ direction as measured by coil 21. The trace recorded may appear as that shown in FIGURE 2B. Measurement of $l_0$ then may be easily carried out.

The above discussion has described the preferred technique for determining $\overrightarrow{H_0}$ from measurements obtained of the remanent magnetization of a core, plus the induced magnetization, and from the knowledge of certain geometric factors of the formation and the borehole at which the core was taken. The operation described in Equation 4 may then be carried out to obtain the formation field $\overrightarrow{H_n}$ at any point in the borehole. Knowledge of this field at any point of interest and knowledge of the geometric factors $a_n$, $l_n$ and $d_n$ in the formation of interest, may be employed to determine, by reverse calculation, the magnitude and direction of the formation magnetization $\overrightarrow{J_n}$ at the point of interest.

More particularly, by performing the operation expressed by Equation 4, one may obtain $H_{x_n}$, $H_{y_n}$, and $H_{z_n}$ which are, respectively, representative of the $x$, $y$, and $z$ components of the formation fields in the borehole at the point of interest. These values may be applied to Equation 18 to obtain:

$$\frac{H_{z_n}}{[H_{x_n}^2 + H_{y_n}^2]^{1/2}} = \tan \phi_n = 2 \tan I_n \quad (19)$$

wherein: $I_n$ is the angle of inclination at the point of interest.

From Equation 19 the following expression may be derived for $I_n$:

$$I_n = \tan^{-1} \frac{H_{z_n}}{2[H_{x_n}^2 + H_{y_n}^2]^{1/2}} \quad (20)$$

Moreover, from the Equation 17 the angle of declination $D_n$ at the point of interest may be determined:

$$D_n = \theta_n = \tan^{-1} \frac{H_{y_n}}{H_{x_n}} \quad (21)$$

From Equation 15 one may then determine the magnitude of the formation magnetization $\vec{J}_n$ at the point of interest:

$$|\vec{J}_n| = \frac{H_{z_n}}{2g_n \sin I_n} \quad (22)$$

wherein: $g_n$ is the geometric factor at the point of interest.

In determining $g_n$, the geometric factors $a_n$ and $l_n$ may be determined, respectively, by the caliper log and by the log of FIGURE 2B. The term $d_n$ is dependent upon the point of interest $z_n$ selected where the formation magnetism $\vec{J}_n$ is to be measured. Thus, knowing $|\vec{J}_n|$, $D_n$, and $I_n$, one has all the information needed to determine the formation magnetism at the point of interest.

From the above discussion, it is now evident that the technique of the present invention for determining formation magnetization has advantages since continuous logs employed in combination with the single core measurement will readily provide the necessary information to obtain formation magnetization at any point desired along the borehole.

As indicated previously, at the point of interest it may be necessary to correct the formation magnetism for induced magnetism if only the remanent magnetism is desired. This correction may be obtained by vector subtraction of the induced magnetism from the total magnetism. The induced magnetism may be obtained by determining the magnetic susceptibility of the formation at the point of interest from the susceptibility log and multiplying this susceptibility by the earth's magnetic field previously measured.

Referring again to FIGURE 1, further details of the borehole logging system will be described. The housing 23 as well as the material of the borehole tool 14 is of nonferromagnetic material. The gyroscopic stabilizer 24 is supported in the housing 23 by support 51. Supports for the coils 20–22 are not shown. The housing 23 is supported in the tool 14 by a bracket 52 and bearing 53 which allow free movement of the housing in any direction within sufficient limits except in the z direction. The outputs from the coils 20–21 are applied to the surface, respectively, by way of conductors 54–56, slip rings 57–59, amplifiers 60–62, and conductors 63–65 of cable conductor 25. At the surface the outputs of the coils are taken by way of slip rings and brushes, illustrated at 70 and 71, and applied to integrators 26–28 by way of amplifiers 72–74. The cable conductor 25 is wound and unwound upon a drum 75 driven by motor 76 and connection 77. The charts of the recorders 29–31 and 50 are driven in correlation with depth by measuring reel 78 and connection illustrated at 79.

The computations described above can be carried out with any one of a number of well-known instrumentations. Further, it is within the skill of one versed in the art, in view of the teachings and mathematical analyses described, to program a suitable digital computer to obtain the desired information.

Now that the invention has been described, modifications will become apparent to those skilled in the art and it is intended to cover such modifications as fall within the scope of the appended claims.

What is claimed is:

1. A method of determining the magnetization of subsurface formations at points spaced along a borehole traversing said formations, comprising the steps of:

obtaining a borehole core from a zone in the formations, said zone from which said core is obtained defining a predetermined point in said borehole, from said core, determining the remanent magnetization of the formations surrounding said borehole at said predetermined point, obtaining a magnetic susceptibility log of the formations surrounding said predetermined point, from said magnetic susceptibility log, determining the magnetic susceptibility of the formations surrounding said predetermined point, measuring the earth's magnetic field in the vicinity of said borehole, forming the product between the earth's magnetic field and the magnetic susceptibility of the formations surrounding said predetermined point to obtain the magnetization of the formations at said predetermined point induced by the earth's field, vectorially adding said remanent magnetization of the formations and said induced magnetization to determine the total magnetization of the formations surrounding said predetermined point, from said total magnetization, determining the magnetic field in the borehole produced by said total magnetization, locating magnetic field gradient measuring means in said borehole at said predetermined point, moving said means through said borehole to a point of interest spaced vertically from said predetermined point to measure the vertical gradient of the magnetic field in said borehole from said predetermined point to said point of interest, with integrating means, integrating said gradient from said predetermined point to said point of interest, combining said magnetic field determined at said predetermined point with the integral of said gradient obtained at said point of interest to determine the magnetic field at said point of interest due to the magnetization of the formations surrounding said point of interest, and from said magnetic field determined at said point of interest, determining the formation magnetization producing said magnetic field at said point of interest.

2. The method of claim 1 comprising the steps of:

obtaining a magnetic susceptibility log of the formations surrounding said point of interest, from said last-named log, determining the magnetic susceptibility of the formations surrounding said point of interest, forming the product between said earth's magnetic field determined and the magnetic susceptibility of the formations surrounding said point of interest to obtain the magnetization of the formations at said point of interest induced by the earth's magnetic field, and vectorially subtracting said induced magnetization from said formation magnetization determined at said point of interest to determine the remanent magnetization of the formations surrounding said point of interest.

3. A method of determining the magnetization of subsurface formations at points spaced along a borehole traversing said formations, comprising the steps of:

determing the $x$, $y$, and $z$ components of the formation magnetic field at a predetermined point in said borehole and due predominantly to the magnetization of the formations surrounding said predetermined point, locating three gradient measuring means in said borehole at said predetermined point, moving said three gradient measuring means vertically through said borehole to a point of interest spaced vertically from said predetermined point, while said three gradient measuring means are moving through said borehole, producing three signals representative predominantly of the $x$, $y$, and $z$ components of the gradient of the formation magnetic field in said borehole in the vertical direction, applying said three signals to integrating means to integrate said three gradient components from said predetermined point to said point of interest, combining, in the following manner, the integral of said three gradient components obtained at said point of interest with said $x$, $y$, and $z$ components of the formation magnetic field determined at said predetermined point to determine the formation magnetic field in said borehole at said point of interest:

$$\vec{H}_n = \left[\int_{x_o}^{z_n} \frac{\partial H_x}{\partial Z} + H_{x_o}\right]i + \left[\int_{z_o}^{z_n} \frac{\partial H_y}{\partial Z} + H_{y_o}\right]j + \left[\int_{z_o}^{z_n} \frac{\partial H_z}{\partial Z} + H_{z_o}\right]k$$

wherein:

$\vec{H}_n$ is the formation magnetic field at said point of interest;

$\partial H_x/\partial Z$, $\partial H_y/\partial Z$, and $\partial H_z/\partial Z$ are the $x$, $y$, and $z$ components of the gradient of the formation magnetic field in the vertical direction;

$H_{x_o}$, $H_{y_o}$, and $H_{z_o}$ art the $x$, $y$, and $z$ components of the formation magnetic field at said predetermined point;

$i$, $j$, and $k$ are unit vectors in the $x$, $y$, and $z$ directions, respectively;

$z_o$ is the vertical location of said predetermined point; and $z_n$ is the vertical location of said point of interest, and from said magnetic field determined at said point of interest, determining the formation magnetization producing said magnetic field at said point of interest.

4. A method of determining the magnetic field at spaced points in a borehole and due to the earth formations, comprising the steps of:

determining the $x$, $y$, and $z$ components of the formation magnetic field at a predetermined point in said borehole and due predominantly to the magnetization of the surrounding formations, locating three gradient measuring means in said borehole at said predetermined point, moving said three gradient means vertically through said borehole to a point of interest spaced vertically from said predetermined point, while said three gradient measuring means are moving through said borehole, producing three signals representative predominantly of the $x$, $y$, and $z$ components of the gradient of the formation magnetic field in said borehole in the vertical direction, applying said three signals to integrating means to integrate said three gradient components from said predetermined point to said point of interest, and combining, in the following manner, the integral of said three gradient components obtained at said point of interest with said $x$, $y$, and $z$ components of the formation magnetic field determined at said predetermined point to determine the formation magnetic field in said borehole at said point of interest:

$$\vec{H}_n = \left[\int_{z_o}^{z_n} \frac{\partial H_y}{\partial Z} + H_{x_o}\right]i + \left[\int_{z_o}^{z_n} \frac{\partial H_y}{\partial Z} + H_{y_o}\right]j + \left[\int_{z_o}^{z_n} \frac{\partial H_z}{\partial Z} + H_{z_o}\right]k$$

wherein:

$\vec{H}_n$ is the formation magnetic field at said point of interest;

$\partial H_x/\partial Z$, $\partial H_y/\partial Z$, and $\partial H_z/\partial Z$ are the $x$, $y$, and $z$ components of the gradient of the formation magnetic field in the vertical direction;

$H_{x_o}$, $H_{y_o}$, and $H_{z_o}$ are the $x$, $y$ and $z$ components of the formation magnetic field at said predetermined point;

$i$, $j$, and $k$ are unit vectors in the $x$, $y$, and $z$ directions, respectively;

$z_o$ is the vertical location of said predetermined point; and $z_n$ is the vertical location of said point of interest.

5. A method of determining the magnetic field at spaced points in a borehole and due to the earth formations, comprising the steps of:

obtaining a log of the magnetic susceptibility of the formations traversing said borehole, from said log, selecting a starting point where the magnetic susceptibility is so low that the magnetic field due predominantly to the magnetization of the surrounding formations may be assumed to be zero, locating magnetic field gradient measuring means in said borehole at said starting point, moving said means vertically through said borehole to a point of interest spaced vertically from said starting point, while said means is moving through said borehole, producing signals representative of the vertical gradient of the magnetic field in said borehole, and applying said signals to integrating means to integrate said gradient from said starting point to said point of interest to determine the magnetic field at said point of interest due to the magnetization of the formations surrounding said point of interest.

6. The method of claim 5 wherein said log is obtained by:

locating magnetic susceptibility measuring means in said borehole, moving said magnetic susceptibility measuring means through said borehole, and recording the magnetic susceptibility of the formations traversed by said borehole to obtain said log of the magnetic susceptibility of the formations.

7. A method of determining the magnetic field at spaced points in a borehole and due to the earth formations, comprising the steps of:

obtaining a borehole core from a zone in the formations, said zone from which said core is obtained defining a predetermined point in said borehole, from said core, determining the remanent magnetization of the formations surrounding said borehole at said predetermined point, obtaining a magnetic susceptibility log of the formations surrounding said predetermined point, from said magnetic susceptibility log, determining the magnetic susceptibility of the formations surrounding said predetermined point, measuring the earth's magnetic field in the vicinity of said borehole, forming the product between the earth's magnetic field and the magnetic susceptibility of the formations surrounding said predetermined point to obtain the magnetization of the formations at said predetermined point induced by the earth's field, vectorially adding said remanent magnetization of the formations and said induced magnetization to determine the total magnetization of the formations surrounding said predetermined point, from said total magnetization, determining the magnetic field in the borehole produced by said total magnetization, locating magnetic field gradient measuring means in said borehole at said predetermined point, moving said means vertically through said borehole to a point of interest spaced vertically from said predetermined point, while said means is moving through said borehole, producing signals representative of the vertical gradient of the magnetic field in said borehole, applying said signals to integrating means to integrate said gradient from said predetermined point to said point of interest, and combining said magnetic field determined at said predetermined point with the integral of said gradient obtained at said point of interest to determine the magnetic field at said point of interest due to the magnetization of the formations surrounding said point of interest.

8. A method of determining the magnetization of subsurface formations at points spaced along a borehole traversing said formations, comprising the steps of:
  obtaining a log of the magnetic susceptibility of the formations traversing said borehole,
  from said log, selecting a starting point where the magnetic susceptibility is so low that the magnetic field due predominantly to the magnetization of the surrounding formations may be assumed to be zero,
  locating magnetic field gradient measuring means in said borehole at said starting point,
  moving said means vertically through said borehole to a point of interest spaced vertically from said starting point,
  with integrating means, integrating said gradient from said starting point to said point of interest to determine the magnetic field at said point of interest due to the magnetization of the formations surrounding said point of interest, and
  from said magnetic field determined at said point of interest, determining the formation magnetization producing said magnetic field at said point of interest.

9. The method of claim 8 comprising the steps of:
  obtaining a magnetic susceptibility log of the formations surrounding said point of interest,
  from said log, determining the magnetic susceptibility of the formations surrounding said point of interest,
  measuring the earth's magnetic field in the vicinity of said borehole,
  forming the product between the earth's magnetic field and the magnetic susceptibility of the formations surrounding said point of interest to obtain the magnetization of the formations at said point of interest induced by the earth's magnetic field, and
  vectorially subtracting said induced magnetization from said formation magnetization to determine the remanent magnetization of the formations surrounding said point of interest.

References Cited

UNITED STATES PATENTS

| | | | |
|---|---|---|---|
| 2,524,360 | 10/1950 | Russell | 324—1 |
| 2,664,542 | 12/1953 | Lynn | 324—8 |
| 2,716,730 | 8/1955 | Williams | 324—8 |
| 3,187,252 | 6/1965 | Hungerford | 324—6 |
| 3,263,161 | 7/1966 | Ruddock et al. | 324—8 |
| 3,317,821 | 5/1967 | Patton et al. | 324—8 |

OTHER REFERENCES

Gradient Measurements in Ground Magnetic Prospecting, Hood et al.; Geophysics, vol. XXX, No. 3 (June 1965), pp. 403–410.

RUDOLPH V. ROLINEC, *Primary Examiner.*

G. R. STRECKER, *Assistant Examiner.*

UNITED STATES PATENT OFFICE
CERTIFICATE OF CORRECTION

Patent No. 3,391,335                                                                  July 2, 1968

Bobbie J. Patton et al.

It is certified that error appears in the above identified patent and that said Letters Patent are hereby corrected as shown below:

Column 2, line 29, "$H_o$" should read -- $\vec{H}_o$ --; line 72, "any should read -- an --. Column 3, line 31, "proportoinal" should read -- proportional --; lines 55 and 56, the right-hand portion of the equation reading $$\frac{\partial H_x}{\partial Z} \quad\quad\text{should read}\quad\quad \frac{\partial H_z}{\partial Z}$$

Column 5, line 34, in equation (9), "$d_o+l_o/2$" should read -- $d_o-l_o/2$ --; line 37, in equation (10), "$d_o+ol/2$" should read -- $d_o-l_o/2$ --; line 69, equation (15), "$H_{z_o}=2|J'_o|\sin I'_o g_o$" should read -- $H_{z_o}=2|\vec{J'_o}|\sin I'_o g_o$ --; line 71, equation (16), "$H_{xy_o}=|J'_o|\cos I'_o g_o$" should read -- $H_{xy_o}=|\vec{J'_o}|\cos I'_o g_o$ --. Column 6, line 1, "ponents" should read -- ponent --; line 17, in equation (18), "tan $I'_o$" should read -- 2 tan $I'_o$ --. Column 8, line 58, "determing" should read -- determining --. Column 9, line 8, the first integral, "$X_o$" should read -- $Z_o$ --; line 18, "art" should read -- are --; line 56, in the first bracketed term, first integral, $$\frac{\partial H_y}{\partial Z} \quad\quad\text{should read}\quad\quad \frac{\partial H_x}{\partial Z}$$

line 67, "y" should read -- y, --.

Signed and sealed this 16th day of December 1969.

(SEAL)
Attest:

EDWARD M. FLETCHER, JR.                              WILLIAM E. SCHUYLER, JR.
Attesting Officer                                                 Commissioner of Patents